US012147401B2

(12) United States Patent
Kabishcer et al.

(10) Patent No.: US 12,147,401 B2
(45) Date of Patent: Nov. 19, 2024

(54) ELECTIVE DEDUPLICATION

(71) Applicant: Dell Products L.P., Round Rock, TX (US)

(72) Inventors: Alexei Kabishcer, Marlborough, MA (US); Uri Shabi, Tel Mond (IL); Bar Harel, Tel Aviv (IL)

(73) Assignee: Dell Products L.P., Round Rock, TX (US)

( * ) Notice: Subject to any disclaimer, the term of this patent is extended or adjusted under 35 U.S.C. 154(b) by 173 days.

(21) Appl. No.: 17/585,240

(22) Filed: Jan. 26, 2022

(65) Prior Publication Data

US 2023/0237030 A1 Jul. 27, 2023

(51) Int. Cl.
| | |
|---|---|
| *G06F 16/00* | (2019.01) |
| *G06F 16/215* | (2019.01) |
| *G06F 16/22* | (2019.01) |
| *G06F 16/2458* | (2019.01) |
| G06F 16/906 | (2019.01) |
| G06F 17/18 | (2006.01) |
| G06F 18/23 | (2023.01) |

(52) U.S. Cl.
CPC ........ *G06F 16/215* (2019.01); *G06F 16/2255* (2019.01); *G06F 16/2462* (2019.01); *G06F 16/906* (2019.01); *G06F 17/18* (2013.01); *G06F 18/23* (2023.01)

(58) Field of Classification Search
CPC .. G06F 16/137; G06F 16/1748; G06F 16/215; G06F 16/2255; G06F 16/2462; G06F 16/906; G06F 3/0641; G06F 17/18; G06F 18/23

See application file for complete search history.

(56) References Cited

U.S. PATENT DOCUMENTS

| | | | | |
|---|---|---|---|---|
| 9,386,037 | B1 * | 7/2016 | Hunt | .................. H04L 63/1433 |
| 2010/0318515 | A1 * | 12/2010 | Ramanathan | ........... G06F 16/41 |
| | | | | 707/723 |
| 2018/0052933 | A1 * | 2/2018 | Verma | ................. G06F 16/9535 |
| 2020/0311414 | A1 * | 10/2020 | Enuka | ................... G06F 16/353 |
| 2022/0237205 | A1 * | 7/2022 | Kamran | ............... G06F 21/602 |

* cited by examiner

*Primary Examiner* — Diedra McQuitery
(74) *Attorney, Agent, or Firm* — Krishnendu Gupta; Deepika Bhayana; Derek Lam

(57) ABSTRACT

Techniques described herein elect how data is deduplicated in a storage system. A similarity hash signature for a data unit is calculated. A digest table is searched for a similarity hash signature within a predetermined distance of the similarity hash signature for the data unit. Based on the search, either a similarity hash signature or a strong hash signature of the data unit is added to the digest table.

18 Claims, 4 Drawing Sheets

FIG. 2

| Deduplication table 205 | | | |
|---|---|---|---|
| Similarity hashes 210a | | Strong hashes 210b | |
| $H_{SIM,1}$ 215a | $Address_1$ 220a | $H_{STRONG,1}$ 215a | $Address_1$ 220a |
| ⋮ | ⋮ | ⋮ | ⋮ |
| $H_{SIM,N}$ 215n | $Address_N$ 220n | $H_{STRONG,I}$ 215i | $Address_I$ 220i |

ELECTIVE DEDUPLICATION

BACKGROUND

Technical Field

This application relates to electing deduplication based on either a similarity hash signature or a strong hash signature.

Description of Related Art

A distributed storage system may include a plurality of storage devices to provide data storage to a plurality of hosts. The plurality of storage devices and the plurality of hosts may be situated in the same physical location, or in one or more physically remote locations. The storage devices and the hosts may be connected to one another over one or more computer networks.

Data deduplication (also referred to simply as "deduplication") is a space-saving technology intended to eliminate redundant (duplicate) data (such as, files) on a data storage system. By saving only one instance of a file, disk space can be significantly reduced. For example, suppose a file of size 10 megabytes (MB) is stored in ten folders of each employee in an organization that has ten employees. As a result, 100 megabytes (MB) of the disk space is consumed to maintain the same file of size 10 megabytes (MB). Deduplication ensures that only one complete copy is saved to a disk. Subsequent copies of the file are only saved as references that point to the saved copy, such that end-users still see their own files in their respective folders. Similarly, a storage system may retain 200 e-mails, each with an attachment of size 1 megabyte (MB). With deduplication, the disk space needed to store each attachment of size 1 megabyte (MB) is reduced to just 1 megabyte (MB) from 200 megabyte (MB) because deduplication only stores one copy of the attachment.

It is noted that the terms "storage device(s)", "drive(s)", and "disk(s)" are employed herein interchangeably, even though it is well known that not all physical storage devices or drives include rotating disks.

SUMMARY OF THE INVENTION

One aspect of the current technique is a method for electing how data is deduplicated in a storage system. The method includes calculating a similarity hash signature for a data unit. A digest table is searched for a similarity hash signature within a predetermined distance of the similarity hash signature for the data unit. Based on the search, either a similarity hash signature or a strong hash signature of the data unit is added to the digest table.

If no similarity hash signature in the digest table falls within the predetermined distance of the similarity hash signature for the data unit, the similarity hash signature of the data unit is added to the digest table. If the digest table includes a similarity hash signature within the predetermined distance of the similarity hash signature for the data unit, the strong hash signature of the data unit is added to the digest table.

If the digest table includes a similarity hash signature within the predetermined distance of the similarity hash signature for the data unit, a strong hash signature is calculated for the data unit, and the digest table is searched for a strong hash signature that matches the strong hash signature for the data unit. If the digest table includes a match of the strong hash signature, the data unit is deduplicated based on the strong hash signature. If the digest table does not include a match of the strong hash signature, the data unit is deduplicated based on the similarity hash signature within the predetermined distance of the similarity hash signature for the data unit.

Another aspect of the current technique is a system, with a processor, for electing how data is deduplicated in a storage system. The processor may be configured to perform any process in conformance with the aspect of the current techniques described above.

Another aspect of the current technique is a non-transitory computer readable medium with code stored thereon. When executed, the code may perform any process in conformance with the aspect of the current techniques described above.

BRIEF DESCRIPTION OF THE DRAWINGS

Features and advantages of the present technique will become more apparent from the following detailed description of exemplary embodiments thereof taken in conjunction with the accompanying drawings in which:

FIG. 2 is a block diagram depicting an exemplary digest table created according to the techniques described herein.

DETAILED DESCRIPTION OF EMBODIMENT(S)

Figure 1:
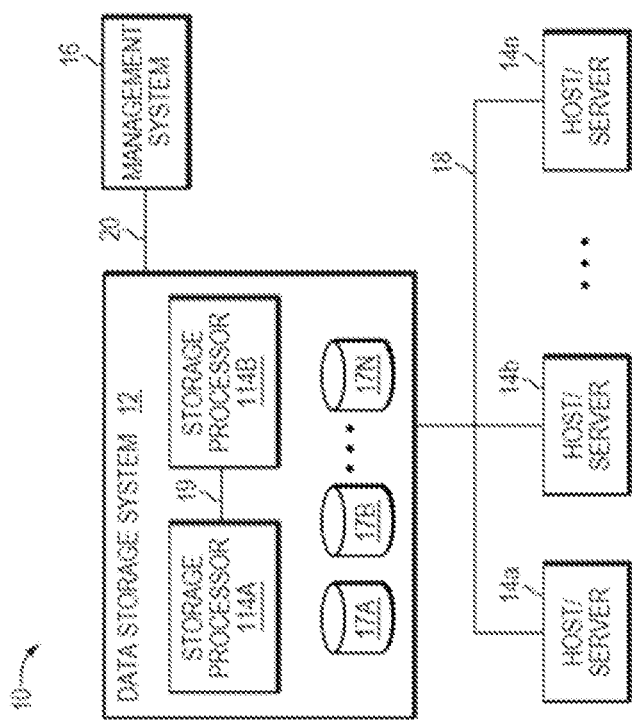
FIG. 1 depicts an example embodiment of a computer system that may be used in connection with performing the techniques described herein.

Described below are techniques for elective deduplication. The techniques build a digest table for deduplication that includes a single hash signature per entry, whether that hash signature be a strong hash signature or a similarity hash signature. The method includes calculating a similarity hash signature for a data unit. A digest table is searched for a similarity hash signature within a predetermined distance of the similarity hash signature for the data unit. Based on the search, either a similarity hash signature or a strong hash signature of the data unit is added to the digest table.

Data deduplication is a process by which a data storage system can detect multiple copies of data and keep a single copy of that data, thus eliminating the redundant data by removing other copies of that data and thus improving storage utilization. In at least some systems, data deduplication requires iterating over data in one or more storage extents.

One approach to deduplication relies on rigorous cryptographic hash signatures (also referred to herein as "strong hash signatures"), which are obtained by applying a cryptographic hash function to a data unit (e.g., page, file, block of data storage, etc.) to product its digest. Because identical copies of data result in the same digest, such deduplication techniques store digests in an index table and compare the strong hash signatures of data to be deduplicated to these digests. If the techniques find a match, a strong copy of data is assured and the data is deduplicated. In this manner, identical portions of data are mapped to a single copy of the data.

Another approach to deduplication is similarity reduction, which identifies data units that are similar. A similarity hash function S generates similar hash signatures for similar data units. The hash signatures are correlated or related to the content of the input to S. Thus, the more similar the content of the data units, the closer the similarity measurements or hash values generated by S for such data units.

For example, if two data units have similarity measurements that are within a specified threshold distance or difference of one another, the two units may be identified as similar to one another (e.g., having similar content or at least some content common to both data units). More generally, two or more data units may be identified as similar to one another if all such units have similarity measurements that fall within a specified threshold window or distance of one another. For example, a threshold window or distance denoting a maximum allowable distance may be defined and all data units having associated similarity hash signatures within the threshold window or maximum allowable distance may be identified as similar to one another. Thus, if the similarity hash signature of a data unit falls within the threshold window or maximum allowable distance from a similarity hash signature in an index table, the data may be deduplicated, despite not being an exact match.

Generally, similarity reduction reduces data more effectively than techniques based on strong hash signatures, though the latter preserves the data in a superior manner. However, a similarity hash signature can be much larger than a strong hash signature (for example, by an order of 2x). Because entries from digest tables must be retrieved speedily, such tables are typically stored in memory. As various functions of a storage system require memory, digest tables must be constructed so as to maximum reduction performance while minimizing size, to avoid degrading overall system performance.

In one conventional approach, both the strong and similarity hash signatures for each data unit are stored. However, storing two hash signatures for all data results in a sizeable digest table, while still incurring undesirable performance deficiencies. For example, two hash signatures must be calculated for all data units, and processing of any given data unit may incur two accesses to the digest table, for the strong and similar hash signatures, without reducing any data (e.g., the data is unique and sufficiently distant from existing entries).

The techniques described herein reduce the number of entries in the digest table by determining, in line, which hash signature shall be stored for a data unit. In at least some implementations in accordance with the techniques as described herein, one or more of the following advantages can be provided: reduced memory requirements for the digest table, effective data reduction for stored data, and high accuracy.

FIG. 1 depicts an example embodiment of a computer system 10 that may be used in connection with performing the techniques described herein. The system 10 includes one or more data storage systems 12 connected to server or hosts 14a-14n through communication medium 18. The system 10 also includes a management system 16 connected to one or more data storage systems 12 through communication medium 20. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the hosts 14a-14n may access and communicate with the data storage systems 12, and may also communicate with other components (not shown) that may be included in the system 10. In one embodiment, the communication medium 20 may be a LAN connection and the communication medium 18 may be an iSCSI, Fibre Channel, Serial Attached SCSI, or Fibre Channel over Ethernet connection.

Each of the hosts 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the hosts 14a-14n and management system 16 may be any one of a variety of proprietary or commercially available single or multi-processor system, or other type of commercially available processor able to support traffic in accordance with any embodiments described herein.

It should be noted that the particular examples of the hardware and software that may be included in the data storage systems 12 are described herein in more detail, and may vary with each particular embodiment. Each of the hosts 14a-14n, the management system 16 and data storage systems 12 may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts 14a-14n, management system 16, and data storage systems 12 may be connected to their respective communication medium 18, 20 may pass through other communication devices, such as switching equipment that may exist such as a phone line, a repeater, a multiplexer or even a satellite. In one embodiment, the hosts 14a-14n may communicate with the data storage systems 12 over an iSCSI or a Fibre Channel connection and the management system 16 may communicate with the data storage systems 12 over a separate network connection using TCP/IP. It should be noted that although FIG. 1 illustrates communications between the hosts 14a-14n and data storage systems 12 being over a first communication medium 18, and communications between the management system 16 and the data storage systems 12 being over a second different communication medium 20, other embodiments may use the same connection. The particular type and number of communication mediums and/or connections may vary in accordance with particulars of each embodiment.

Each of the hosts 14a-14n may perform different types of data operations in accordance with different types of tasks. In the embodiment of FIG. 1, any one of the hosts 14a-14n may issue a data request to the data storage systems 12 to perform a data operation. For example, an application executing on one of the hosts 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. The management system 16 may, for example, display information about a current storage volume configuration, provision resources for a data storage system 12, and the like.

Each of the data storage systems 12 may include one or more data storage devices 17a-17n. Unless noted otherwise, data storage devices 17a-17n may be used interchangeably herein to refer to hard disk drive, solid state drives, and/or other known storage devices. One or more data storage devices 17a-17n may be manufactured by one or more different vendors. Each of the data storage systems included in 12 may be inter-connected (not shown). Additionally, the data storage systems 12 may also be connected to the hosts 14a-14n through any one or more communication connections that may vary with each particular embodiment. The type of communication connection used may vary with certain system parameters and requirements, such as those related to bandwidth and throughput required in accordance with a rate of I/O requests as may be issued by the hosts 14a-14n, for example, to the data storage systems 12. It should be noted that each of the data storage systems 12 may operate stand-alone, or may also be included as part of a storage area network (SAN) that includes, for example, other components such as other data storage systems 12. The particular data storage systems 12 and examples as described herein for purposes of illustration should not be construed as a limitation. Other types of commercially available data storage systems 12, as well as processors and hardware controlling access to these particular devices, may also be included in an embodiment.

In such an embodiment in which element 12 of FIG. 1 is implemented using one or more data storage systems 12, each of the data storage systems 12 may include code thereon for performing the techniques as described herein.

Servers or hosts, such as 14a-14n, provide data and access control information through channels on the communication medium 18 to the data storage systems 12, and the data storage systems 12 may also provide data to the host systems 14a-14n also through the channels 18. The hosts 14a-14n may not address the disk drives of the data storage systems 12 directly, but rather access to data may be provided to one or more hosts 14a-14n from what the hosts 14a-14n view as a plurality of logical devices or logical volumes (LVs). The LVs may or may not correspond to the actual disk drives. For example, one or more LVs may reside on a single physical disk drive. Data in a single data storage system 12 may be accessed by multiple hosts 14a-14n allowing the hosts 14a-14n to share the data residing therein. An LV or LUN (logical unit number) may be used to refer to the foregoing logically defined devices or volumes.

The data storage system 12 may be a single unitary data storage system, such as single data storage array, including two storage processors 114A, 114B or computer processing units. Techniques herein may be more generally use in connection with any one or more data storage system 12 each including a different number of storage processors 114 than as illustrated herein. The data storage system 12 may include a data storage array 116, including a plurality of data storage devices 17a-17n and two storage processors 114A, 114B. The storage processors 114A, 114B may include a central processing unit (CPU) and memory and ports (not shown) for communicating with one or more hosts 14a-14n. The storage processors 114A, 114B may be communicatively coupled via a communication medium such as storage processor bus 19. The storage processors 114A, 114B may be included in the data storage system 12 for processing requests and commands. In connection with performing techniques herein, an embodiment of the data storage system 12 may include multiple storage processors 114 including more than two storage processors as described. Additionally, the two storage processors 114A, 114B may be used in connection with failover processing when communicating with the management system 16. Client software on the management system 16 may be used in connection with performing data storage system management by issuing commands to the data storage system 12 and/or receiving responses from the data storage system 12 over connection 20. In one embodiment, the management system 16 may be a laptop or desktop computer system.

The particular data storage system 12 as described in this embodiment, or a particular device thereof, such as a disk, should not be construed as a limitation. Other types of commercially available data storage systems 12, as well as processors and hardware controlling access to these particular devices, may also be included in an embodiment.

In some arrangements, the data storage system 12 provides block-based storage by storing the data in blocks of logical storage units (LUNs) or volumes and addressing the blocks using logical block addresses (LBAs). In other arrangements, the data storage system 12 provides file-based storage by storing data as files of a file system and locating file data using inode structures. In yet other arrangements, the data storage system 12 stores LUNs and file systems, stores file systems within LUNs, and so on.

The two storage processors 114A, 114B (also referred to herein as "SP") may control the operation of the data storage system 12. The processors may be configured to process requests as may be received from the hosts 14a-14n, other data storage systems 12, management system 16, and other components connected thereto. Each of the storage processors 114A, 114B may process received requests and operate independently and concurrently with respect to the other processor. With respect to data storage management requests, operations, and the like, as may be received from a client, such as the management system 16 of FIG. 1 in connection with the techniques herein, the client may interact with a designated one of the two storage processors 114A, 114B. Upon the occurrence of failure of one the storage processors 114A, 114B, the other remaining storage processors 114A, 114B may handle all processing typically performed by both storage processors 114A.

FIG. 2 depicts an exemplary digest table 205 that can be stored in the memory of data storage system 12. The table 205 may include two portions 210a, 210b. One portion 210a may store similarity hash signatures, along with pointers to the locations of the data associated with the hashes. Another portion 210b may store strong hash signatures, also with pointers to the locations of the data associated with the hashes.

When the storage system 12 deduplicates data, the storage system 12 calculates a similarity hash signature $H_{SIM}$ for the data. The storage system 12 searches the portion 210a of the digest table 205 storing similarity hash signatures for an entry within a threshold distance of $H_{SIM}$. If no matches are found, then $H_{SIM}$ is stored in portion 210b, along with a pointer to the data, as the original copy of that data.

However, if the portion 210a includes an entry within the threshold distance of $H_{SIM}$, the storage system 12 calculates a strong hash signature $H_{STRONG}$ for the data. The storage system 12 then searches the portion 210b of the table 205 that stores strong hash signatures, for $H_{STRONG}$. If the portion 210b includes a match, then an exact copy of the data has previously been stored and the storage system 12 deduplicates on this basis. However, if there is no match, then the storage system 12 deduplicates based on the similar data, i.e., the entry in the portion 210a within the threshold distance of $H_{SIM}$. Additionally, $H_{STRONG}$ is added to the portion 210a.

In this manner, the digest table 205 stores a single hash signature per data unit. For data units sufficiently different from previously encountered data units (i.e., data units whose similarity hash signatures do not fall within a threshold distance of stored similarity hash signatures), the storage system 12 stores their similarity hash signatures. However, if one data unit is sufficiently similar to another, the storage system 12 stores its strong hash signature. Consequently, the digest table 205 is filled with similarity hash signatures of dissimilar data units, as understood by the distances between their similarity hash signatures, and strong hash signatures of data units whose contents are "clustered" around the data units whose similarity hash signatures have been stored. This approach reduces the overall size of memory required by the digest table 205, while maximizing the data reduction advances of deduplication techniques based on similar and strong hash signature.

Figure 3A:
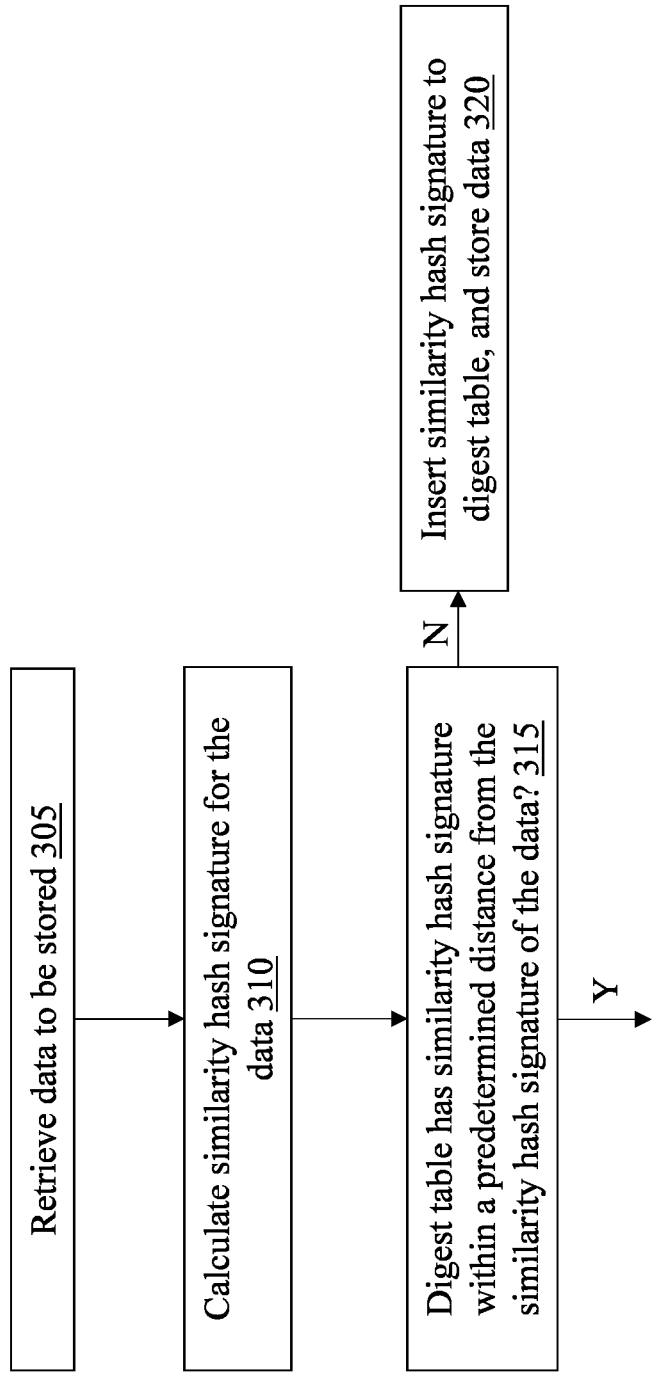
FIGS. 3A-3B are exemplary flow diagrams depicting techniques for elective deduplication.
Figure 3B:
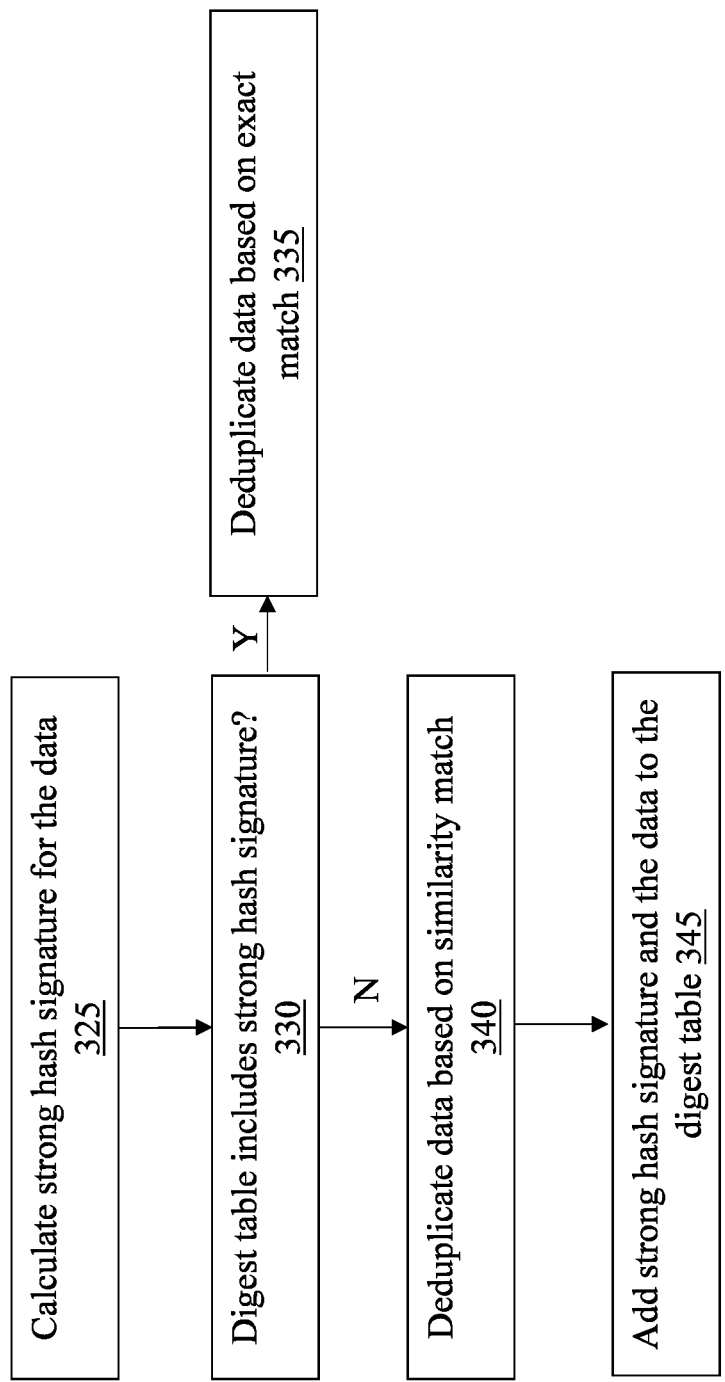

FIG. 3A-3B is an exemplary flow diagram for building a digest table for deduplication that includes a single hash signature per entry, whether that hash signature be a strong hash signature or a similarity hash signature. The method includes retrieving data to be stored (step 305). A similarity hash signature of the data is calculated (step 310). The digest table is searched for a similarity hash signature within a predetermined distance from the similarity hash signature of the data (step 315). If none of the entries meet this criteria, the similarity hash signature of the data is added to the digest table, and the data is stored (step 320).

However, if the digest table includes a similarity hash signature within a predetermined distance from the similarity hash signature of the data, the storage system calculates a strong hash signature of the data (step 325). Then, the digest table is searched for the strong hash signature (step 330). If the strong hash signature is found, the data is deduplicated based on the data in the digest table associated with the strong hash signature (step 335). Otherwise, the data is deduplicated based on the data in the digest table with a similarity hash signature within a predetermined distance from the similarity hash signature of the data (step 340). Furthermore, the strong hash signature of the data is added to the digest table (step 345).

It should again be emphasized that the implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for electing deduplication in a storage system, the method comprising:
    calculating a similarity hash signature for a data unit of a storage system;
    searching a digest table of the storage system for a similarity hash signature within a predetermined distance of the similarity hash signature for the data unit;
    using the search to determine whether to add a similarity hash signature or a strong hash signature of the data unit to the digest table; and
    deduplicating the data unit from a storage device of the storage system based on the determination of whether the similarity hash signature or the strong hash signature is added to the digest table.

2. The method of claim 1, wherein determining whether to add the similarity hash signature or the strong hash signature of the data unit to the digest table comprises:
    adding the similarity hash signature of the data unit to the digest table if no similarity hash signature in the digest table falls within the predetermined distance of the similarity hash signature for the data unit.

3. The method of claim 1, wherein determining whether to add the similarity hash signature or the strong hash signature of the data unit to the digest table comprises:
adding the strong hash signature of the data unit to the digest table if the digest table includes a similarity hash signature within the predetermined distance of the similarity hash signature for the data unit.

4. The method of claim 1, wherein determining whether to add the similarity hash signature or the strong hash signature of the data unit to the digest table comprises:
calculating a strong hash signature for the data unit; and
searching the digest table for a strong hash signature that matches the strong hash signature for the data unit.

5. The method of claim 4, wherein determining whether to add the similarity hash signature or the strong hash signature of the data unit to the digest table comprises:
if the digest table includes a match of the strong hash signature, deduplicating the data unit based on the strong hash signature.

6. The method of claim 4, wherein determining whether to add the similarity hash signature or the strong hash signature of the data unit to the digest table comprises:
if the digest table does not include a match of the strong hash signature, deduplicating the data unit based on the similarity hash signature within the predetermined distance of the similarity hash signature for the data unit.

7. A system for electing deduplication in a storage system, the system including a processor configured to:
calculate a similarity hash signature for a data unit of a storage system;
search a digest table of the storage system for a similarity hash signature within a predetermined distance of the similarity hash signature for the data unit;
use the search to determine whether to add a similarity hash signature or a strong hash signature of the data unit to the digest table; and
deduplicate the data unit from a storage device of the storage system based on the determination of whether the similarity hash signature or the strong hash signature is added to the digest table.

8. The system of claim 7, wherein the processor is further configured to:
add the similarity hash signature of the data unit to the digest table if no similarity hash signature in the digest table falls within the predetermined distance of the similarity hash signature for the data unit.

9. The system of claim 7, wherein the processor is further configured to:
add the strong hash signature of the data unit to the digest table if the digest table includes a similarity hash signature within the predetermined distance of the similarity hash signature for the data unit.

10. The system of claim 7, wherein the processor is further configured to:
calculate a strong hash signature for the data unit; and
search the digest table for a strong hash signature that matches the strong hash signature for the data unit.

11. The system of claim 10, wherein the processor is further configured to:
if the digest table includes a match of the strong hash signature, deduplicating the data unit based on the strong hash signature.

12. The system of claim 10, wherein the processor is further configured to:
if the digest table does not include a match of the strong hash signature, deduplicating the data unit based on the similarity hash signature within the predetermined distance of the similarity hash signature for the data unit.

13. A non-transitory computer readable medium comprising code stored thereon that, when executed, performs a method of coordinating inline deduplication among nodes in a storage system comprising:
calculating a similarity hash signature for a data unit of a storage system;
searching a digest table of the storage system for a similarity hash signature within a predetermined distance of the similarity hash signature for the data unit;
using the search to determine whether to add a similarity hash signature or a strong hash signature of the data unit to the digest table; and
deduplicating the data unit from a storage device of the storage system based on the determination of whether the similarity hash signature or the strong hash signature is added to the digest table.

14. The non-transitory computer readable medium of claim 13, further comprising code that, when executed, performs:
adding the similarity hash signature of the data unit to the digest table if no similarity hash signature in the digest table falls within the predetermined distance of the similarity hash signature for the data unit.

15. The non-transitory computer readable medium of claim 13, further comprising code that, when executed, performs:
adding the strong hash signature of the data unit to the digest table if the digest table includes a similarity hash signature within the predetermined distance of the similarity hash signature for the data unit.

16. The non-transitory computer readable medium of claim 13, further comprising code that, when executed, performs:
calculating a strong hash signature for the data unit; and
searching the digest table for a strong hash signature that matches the strong hash signature for the data unit.

17. The non-transitory computer readable medium of claim 16, further comprising code that, when executed, performs:
if the digest table includes a match of the strong hash signature, deduplicating the data unit based on the strong hash signature.

18. The non-transitory computer readable medium of claim 16, further comprising code that, when executed, performs:
if the digest table does not include a match of the strong hash signature, deduplicating the data unit based on the similarity hash signature within the predetermined distance of the similarity hash signature for the data unit.

* * * * *